(No Model.)
G. B. DEAN.
WHEEL.
No. 411,887. Patented Oct. 1, 1889.
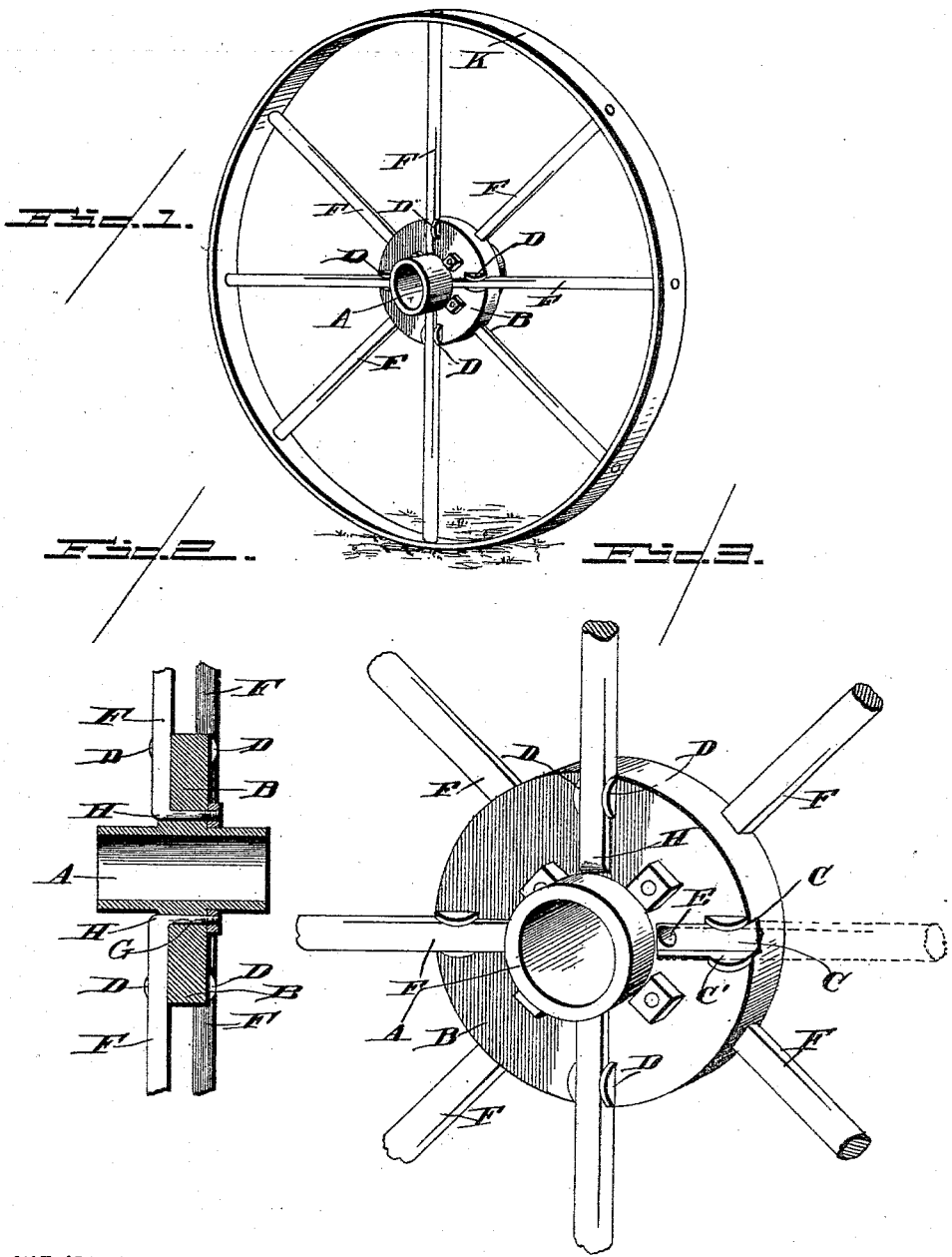
WITNESSES
Walter H. Pumphrey.
C. L. Taylor.
INVENTOR
George B. Dean.
by John P. Manahan,
Attorney

UNITED STATES PATENT OFFICE.

GEORGE B. DEAN, OF LAMOILLE, ILLINOIS.

WHEEL.

SPECIFICATION forming part of Letters Patent No. 411,887, dated October 1, 1889.

Application filed November 12, 1888. Serial No. 290,637. (No model.)

*To all whom it may concern:*

Be it known that I, GEORGE B. DEAN, a citizen of the United States, residing at Lamoille, in the county of Bureau and State of Illinois, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to improvements in wheels; and it consists in certain novel features hereinafter described and claimed.

My invention is adapted to the construction of wheels for general purposes, such as agricultural implements, vehicles, wheelbarrows, &c.

As my invention pertains exclusively to the wheel, I do not deem it necessary to show or describe any other portion of the vehicle or implement to which it may be applied.

In the drawings, Figure 1 is a perspective of a wheel embodying my invention. Fig. 2 is a longitudinal section of the hub. Fig. 3 is an enlarged perspective of the end of the hub.

A is a cylindrical metallic hub fitted internally in the usual mode to rotate upon the usual spindle.

B is an annular flange formed around the periphery of the hub A and located at or near the longitudinal center of the latter. The flange B can be either shrunk upon the cylinder A or it may be formed integral therewith by casting or otherwise. Around the flange B are formed radial grooves C. The grooves C are formed alternately on opposite sides of the flange B and at regular intervals therein. To afford deeper walls for the grooves C and to increase in a great degree the strength of the flange B, there are formed on the side of the latter adjacent to each groove C lateral projections D D. The inner end of each groove C communicates with the transverse hole or opening E formed through the flange B.

F F are steel spokes having a portion G of their inner ends bent substantially at a right angle with the main portion thereof. The ends G of the spokes F are adapted to be inserted in and snugly fit the opening E in the flange B. Said ends are inserted from the grooved side of said flange, and that portion of the main part of the spoke F next to the angle H therein is partially embedded and closely fits in the groove C. After the end G of the spoke F is inserted in the hole E it may be secured therein by being riveted at its extreme end against the opposite side of said flange, or, if preferred, it may be made of such length as to project slightly through said flange and be provided at its extremity with the usual thread and nut.

The walls C' C' of the groove C afford lateral support and resistance to the spoke F, while the end pressure of said spoke is received and sustained by the hole E in flange B. By inserting the spokes F into the flange B from opposite sides of the latter alternately a greater width of seat is afforded to the inner ends of said spokes.

The outer ends of the spokes F are projected sufficiently through the annular metallic rim or felly K to be riveted in the outer surface of the latter, or they can be attached to said rim in any other suitable mode.

The advantages of my invention are that a wheel can thereby be very cheaply and simply made, that the entire wheel can be constructed of metal and thereby insured against contraction and expansion from moisture, and if the spokes and rim are made of steel the entire wheel will be comparatively light. In case of casual fracture of or injury to any one of the spokes F the same can be readily removed by common tools and a new one substituted by punching out the inner end from the flange B and withdrawing the outer end of said spoke from the rim K and substituting a new spoke therefor.

What I claim as my invention, and desire to secure by Letters Patent of the United States, is—

The combination of the hub having a central annular flange, said flange being provided with radial grooves in its sides, transverse openings at the inner ends of said grooves, and lugs near the outer ends of the same at the sides thereof, and the spokes fitting in said grooves and between said lugs and having their inner ends bent laterally and passed through the transverse openings in the flange, as set forth.

In testimony whereof I affix my signature in presence of two witnesses.

GEORGE B. DEAN.

Witnesses:
JOHN G. MANAHAN,
ELLIOTT LeROY GALT.